(12) United States Patent
Sheu

(10) Patent No.: US 7,154,704 B2
(45) Date of Patent: *Dec. 26, 2006

(54) DATA STORAGE DEVICE WITH A LOW PROFILE SPINDLE MOTOR HAVING HUB AND DRIVE MEMBER ARRANGED ON OPPOSITE SIDES OF A BASEPLATE

(75) Inventor: Ming-Goei Sheu, Cupertino, CA (US)

(73) Assignee: ESGW Holdings Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 11/149,091

(22) Filed: Jun. 9, 2005

(65) Prior Publication Data

US 2005/0225896 A1   Oct. 13, 2005

Related U.S. Application Data

(63) Continuation of application No. 10/402,773, filed on Mar. 28, 2003, now Pat. No. 6,961,210.

(51) Int. Cl.
   *G11B 17/02* (2006.01)
(52) U.S. Cl. .................................... 360/99.08
(58) Field of Classification Search ............. 360/99.08
   See application file for complete search history.

(56) References Cited

U.S. PATENT DOCUMENTS 5,734,530 A * 3/1998 Kim ..................... 360/271.2
RE36,016 E * 12/1998 Cap et al. ............... 360/97.01
6,018,442 A * 1/2000 Verbunt et al. .......... 360/271.2
6,271,988 B1 * 8/2001 Papst ...................... 360/98.07
6,316,853 B1 * 11/2001 MacLeod .................. 310/67 R
6,344,946 B1 * 2/2002 Papst ...................... 360/99.08
6,373,154 B1 * 4/2002 Sohn et al. ................... 310/51
2001/0022869 A1 * 9/2001 Tanaka et al. .............. 384/100

* cited by examiner

*Primary Examiner*—Jefferson Evans
(74) *Attorney, Agent, or Firm*—Saile Ackerman LLC; Stephen B. Ackerman

(57) ABSTRACT

A data storage device (10) includes a stator (20), a rotor (50) rotatable about the stator via a pair of bearings (26), a cover (70), and two data storage disks (80). The stator includes a baseplate (22), and radially extending stator laminations (32) under the baseplate. The bearings are fixed in top and bottom ends of the baseplate. The rotor includes a spindle shaft (52), a hub (54), and a drive member (56). The shaft is fixed in the bearings, and the hub is fixed to a top end of the shaft. The drive member is fixed to a bottom end of the shaft, at a side of the baseplate opposite from the hub. The cover is fixed to a bottom of the baseplate, surrounding the drive member. The cover helps prevent contaminants such as dust from entering a clean chamber of the data storage device that surrounds the shaft.

6 Claims, 3 Drawing Sheets

DATA STORAGE DEVICE WITH A LOW PROFILE SPINDLE MOTOR HAVING HUB AND DRIVE MEMBER ARRANGED ON OPPOSITE SIDES OF A BASEPLATE

This application is a Continuation of application Ser. No. 10/402,773, filed on Mar. 28, 2003, now U.S. Pat. No. 6,961,210 which is herein incorporated by reference in its entirety.

BACKGROUND OF THE INVENTION

1. Field of the Invention

The present invention relates to data storage devices for apparatus such as computers, and more particularly to a data storage device incorporating a spindle motor and having improved dynamic properties.

2. Description of Prior Art

Various data storage devices are installed in electronic apparatus for communication and handling of data. Such devices include, for example, hard disk drives, floppy disk drives and CD-ROM (Compact Disk-Read Only Memory) drives.

The trend toward portable applications for data storage devices has created the need for a new class of miniaturized data storage devices. Such data storage devices are being required to meet increasingly stringent physical and operating environment requirements. Small size and durability under harsh environmental conditions are characteristics that must co-exist in modern portable applications. Generally, conventional data storage devices cannot meet the above requirements. Referring to FIG. 3, a conventional data storage device comprises a stator 220, a rotor 240, a plurality of spaced, parallel disks 260 and a clamp 280. The stator 220 comprises a plurality of radial stator laminations 222. A winding 224 is wound around each stator lamination 222. The rotor 240 comprises a spindle shaft 242, and a hub 246 fixed to a top end of the shaft 242. The shaft 242 is fixed in a pair of bearings 244 seated in the stator 220. The rotor 240 is thus rotatably attached to the stator 220. A magnet 248 is attached to an inside of a bottom portion of the hub 246, the magnet 248 facing free ends of the stator laminations 222. The disks 260 are attached around the hub 246 by a clamp 280. The clamp 280 is fixed to the spindle shaft 242 by a screw 290. The clamp 280 comprises a resilient part 282 pressing a topmost disk 260. When the windings 224 are electrified, the magnet 248 is driven by the stator laminations 222, and the disks 260 of the rotor 240 rotate about the stator 220.

The above-described conventional data storage device comprises the hub 246 and a major portion of the stator 220 disposed at a same side of a baseplate of the stator 220. This necessarily requires a significant minimum height from the baseplate to a top of the hub 246. The height restricts the range of portable applications in which the data storage device can be used. In addition, the top end of the shaft 242 is located far from the baseplate, which results in instability of the bearings 244 and poor dynamic properties for the data storage device.

SUMMARY OF THE INVENTION

Accordingly, an object of the present invention is to provide a data storage device incorporating a spindle motor and having excellent dynamic properties.

Another object of the present invention is to provide a data storage device incorporating a spindle motor and having a protected clean chamber.

To achieve the above objects, a data storage device of the present invention includes a stator, a rotor rotatable about the stator via a pair of bearings, a cover and at least one data storage disk. The stator comprises a baseplate, and a plurality of radially extending stator laminations located under the baseplate. The bearings are fixed in top and bottom ends of the baseplate. The rotor includes a spindle shaft, a hub, and a drive member. The shaft is fixed in the bearings, and the hub is fixed to a top end of the shaft. The drive member is fixed to a bottom end of the shaft, at a side of the baseplate opposite from the hub. The cover is fixed to a bottom of the baseplate, surrounding the drive member. The cover helps prevent contaminants such as dust from entering a clean chamber of the data storage device that surrounds the shaft.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
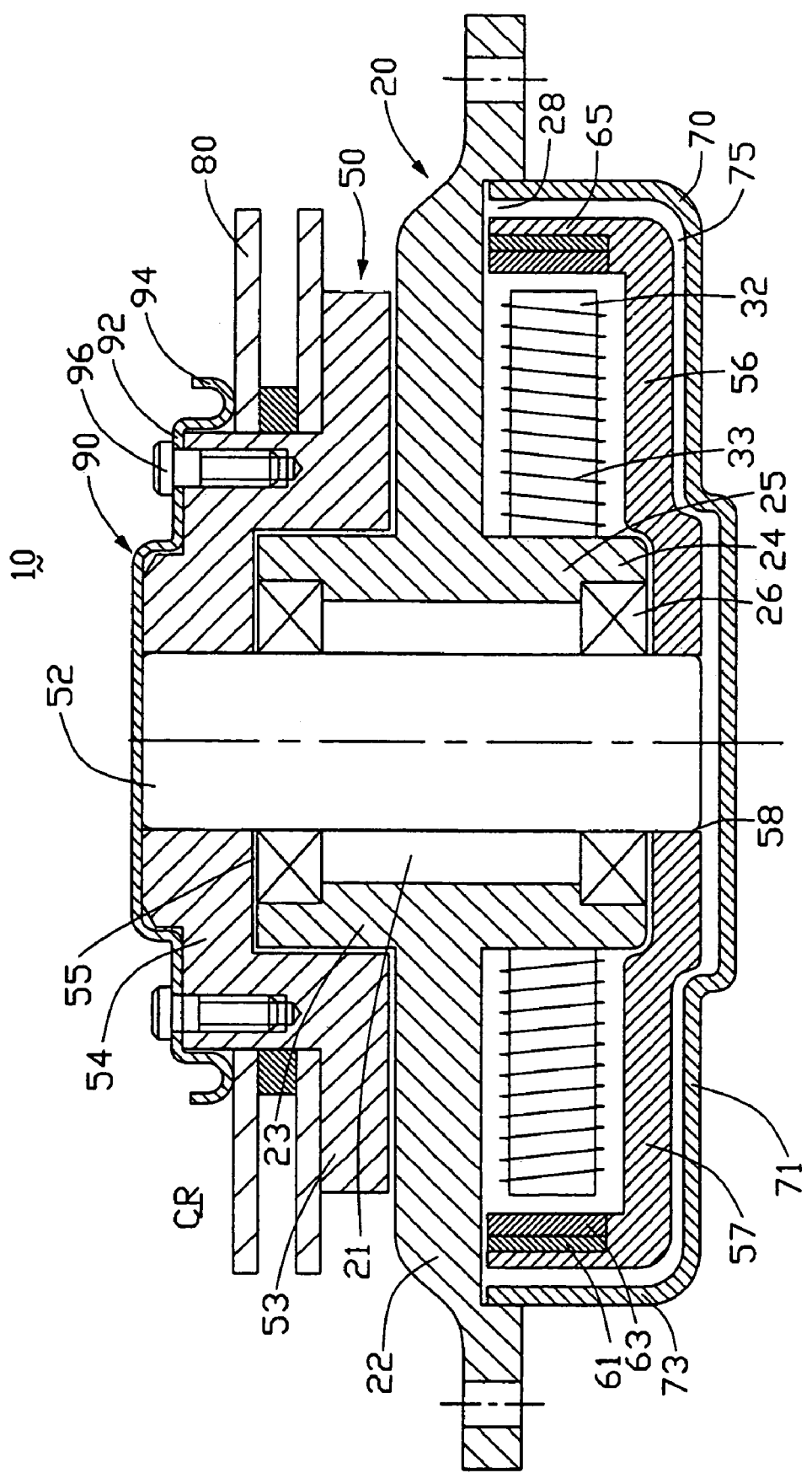
FIG. 1 is a schematic, cross-sectional view of a data storage device in accordance with a preferred embodiment of the present invention.

Referring to FIG. 1, a data storage device 10 in accordance with a preferred embodiment of the present invention comprises a stator 20, a baseplate 22, a rotor 50, a cover 70 and at least one data storage disk 80. For the sake of simplifying the following description, two disks 80 are shown and described hereafter, by way of illustration only.

The stator 20 comprises a baseplate 22, and a plurality of radially extending stator laminations 32 below the baseplate 22. The baseplate 22 extends upwardly and downwardly at a middle thereof to form a cylindrical upper container 23 and a cylindrical lower container 24 respectively. The upper and lower containers 23, 24 cooperatively form a tube 25, with the tube 25 defining a central hole 21 therethrough. A pair of bearings 26 is received in the upper and lower containers 23, 24 respectively, for rotatably connecting the rotor 50 to the stator 20. The baseplate 22 defines an annular recess 28 surrounding the lower container 24. The stator laminations 32 radially extend from the lower container 24 in the recess 28. A winding 33 is wound around each stator lamination 32.

The rotor 50 comprises a spindle shaft 52, a hub 54 fixed around a top end of the shaft 52, and a drive member 56 fixed around a bottom end of the shaft 52. The shaft 52 is received in the tube 25, and fixed in the bearings 26. The rotor 50 is thus rotatably connected to the stator 20. A cavity 55 is defined in a bottom central portion of the hub 54, the cavity 55 receiving the upper container 23 of the stator 20 therein. The hub 54 comprises a circumferential shoulder 53 at a bottom thereof. The hub 54 defines a plurality of screw holes (not labeled) in a top thereof. An outer diameter of a portion of the hub 54 surrounding the upper container 23 is substantially equal to a diameter of a central opening (not labeled) of each disk 80. The disks 80 are engaged around the hub 54, with a bottom one of the disks supported on the shoulder 53, and a top one of the disks 80 being engaged on the hub 54 by a clamp 90. The clamp 90 comprises an inner fixing part 92, and an outer elastic pressing part 94 extending from the fixing part 92. The fixing part 192 is fixed to the hub 54 by a plurality of setscrews 96 being engaged in the screw holes of the hub 54. The pressing part 94 has a generally U-shaped cross-section, and resiliently presses the top disk 80. The drive member 56 is generally cylindrical, and comprises a base 57 defining a central opening 58. The shaft 52 is received in the opening 58, and is thus fixed to the base 57. A circumferential driven portion 65 extends upwardly from base 57, and an annular cutout (not labeled) is defined in an inside of the driven portion 65. An annular magnetic shield 61 is attached to an inside of the driven portion 65 in the cutout, and an annular magnet 63 is attached to an inside of the magnetic shield 61 in the cutout. The magnet 63 closely surrounds the stator laminations 32, thereby defining a cylindrical gap between the stator laminations 32 and the magnet 63.

The cover 70 is for preventing contaminants such as dust from accessing a bottom one of the bearings 26 and entering a clean chamber (not labeled) of the data storage device 10 that surrounds the shaft 52. The cover 70 comprises a bottom tray 71, and an annular fixing portion 73 extending upwardly from a circumferential edge of the bottom tray 71. An outer diameter of the fixing portion 73 is substantially equal to a largest diameter of the annular recess 28 of the baseplate 22. The cover 70 is thus inlaid into the baseplate 22, with the cover 70 and the baseplate 22 cooperatively defining a chamber 75 therebetween. The chamber 75 contains the stator laminations 32 and drive member 56 therein.

In assembly, the shaft 52 in the tube 25 is rotatably connected with the baseplate 22 of the stator 20 via the bearings 26. Thus the hub 54 is rotatably connected above the baseplate 22, and the drive member 56 is rotatably connected under the baseplate 22. The clamp 90 is fixed to the hub 54 by the setscrews 96, such that the pressing part 94 of the clamp 90 resiliently presses an inner portion of the top disk 80. The disks 80 are thereby firmly and securely positioned on the hub 54. When the windings 33 are electrified, the magnet 63 drives the combined rotor 50 and disks 80 to rotate about the stator 20.

Figure 2:
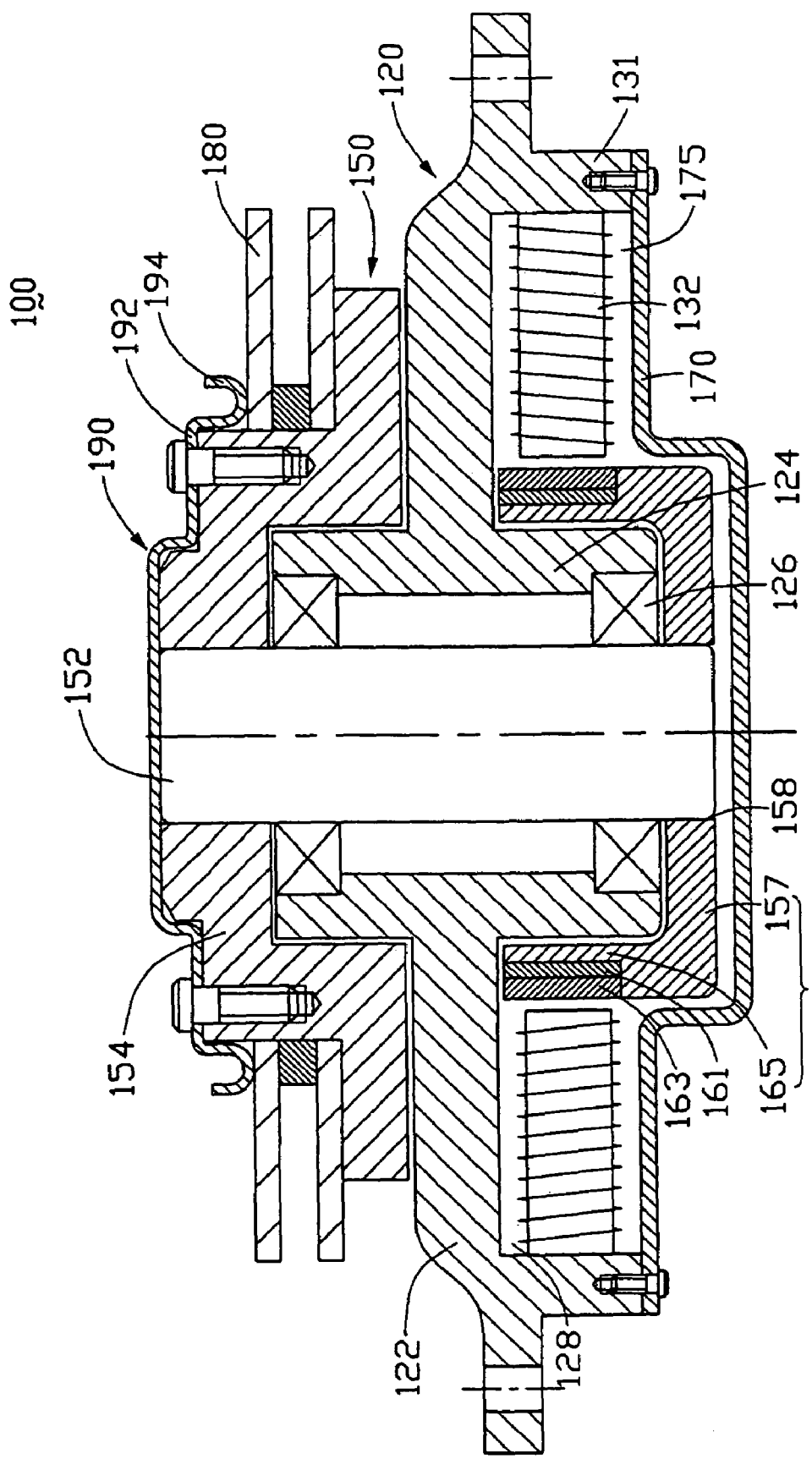
FIG. 2 is a schematic, cross-sectional view of a data storage device in accordance with an alternative embodiment of the present invention.
Figure 3:
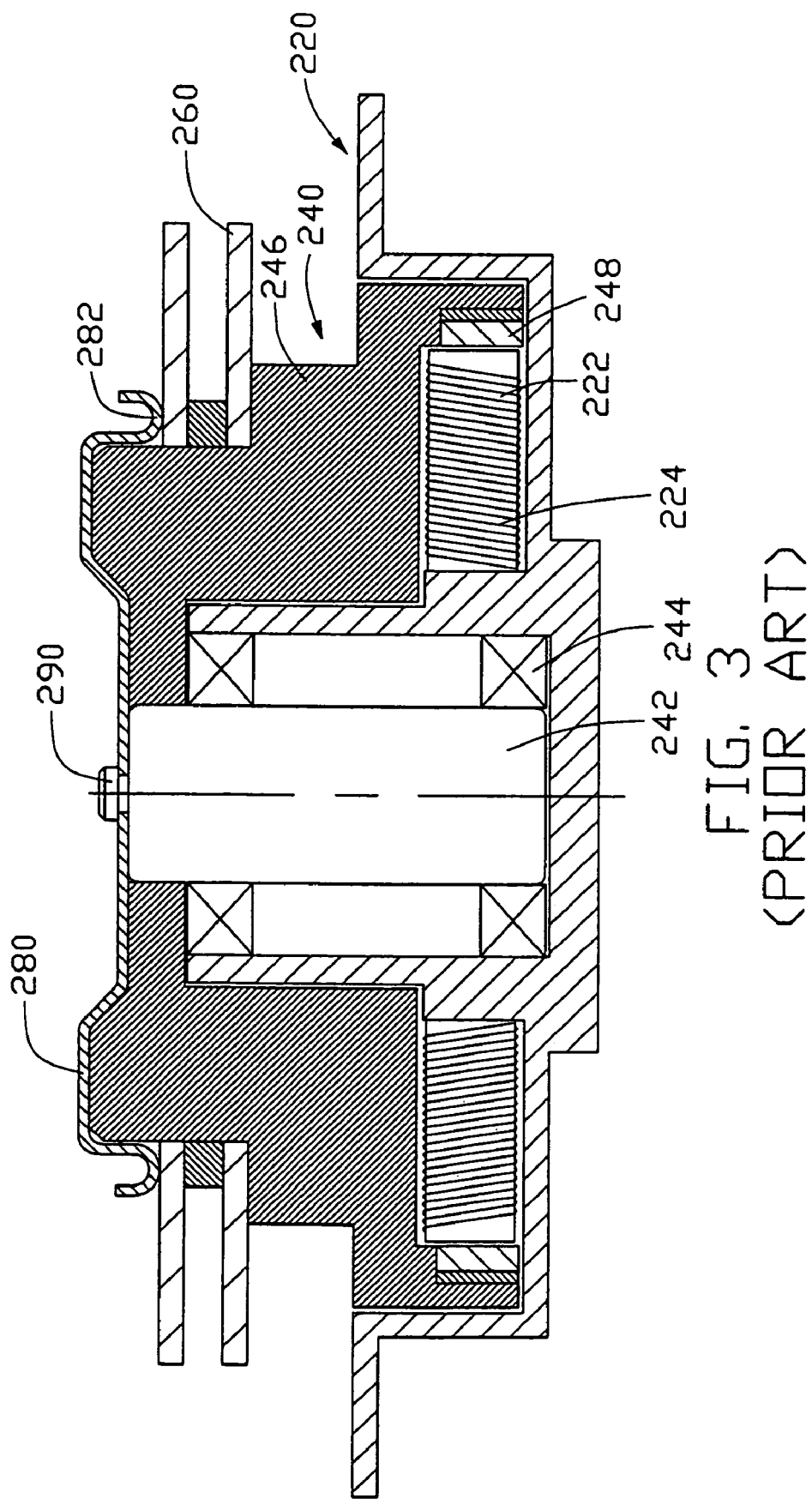
FIG. 3 is a schematic, cross-sectional view of a conventional data storage device.

Referring to FIG. 2, a data storage device 100 in accordance with an alternative embodiment of the present invention comprises a stator 120, a rotor 150, a cover 170 and a pair of data storage disks 180. The stator 120 comprises a baseplate 122, and a plurality of stator laminations 132 below the baseplate 122. The rotor 150 comprises a spindle shaft 152, a hub 154, and a drive member 156. In the alternative embodiment of the present invention, the arrangements of the drive member 156 and stator laminations 132 are different from the arrangements of the drive member 56 and stator laminations 32 of the preferred embodiment.

The baseplate 122 defines a hole (not labeled) in a center thereof. The baseplate 122 extends upwardly and downwardly at a middle thereof to form a tube 124. A pair of bearings 126 is fixed in the tube 124, for rotatably connecting the rotor 150 with the stator 120. The baseplate 122 comprises a circumferential flange 131 depending therefrom, and an annular recess 128 is defined within the flange 131. The recess 128 surrounds a lower portion of the tube 124. The stator laminations 132 are attached to an inside of the flange 131, and extend radially inwardly from the flange 131 within the recess 128.

The shaft 152 and the hub 154 of the rotor 150 are similar to the shaft 52 and the hub 54 of the rotor 50 of the preferred embodiment. The shaft 152 is received in the tube 124, and is fixed in the bearings 126. The rotor 150 is thus rotatably connected to the stator 120. The hub 154 is fixed to a top end of the shaft 152, and a plurality of screw holes (not labeled) is defined in a top of the hub 154. A diameter of the hub 154 where it surrounds an upper portion of the tube 124 is substantially equal to a diameter of a central opening (not labeled) of each of the disks 180. The disks 180 are engaged around the hub 154, with a top one of the disks 180 being engaged on the hub 154 by a clamp 190. The clamp 190 comprises a fixing part 192, and an elastic pressing part 194. The fixing part 192 of the clamp 190 is fixed to the hub 154 by a plurality of setscrews (not shown) engaged in the screw holes of the hub 154.

As stated above, the arrangement of the drive member 156 is different from the arrangement of the drive member 56 of the preferred embodiment. The drive member 156 is substantially cylindrical, and comprises a bottom plate 157 defining an opening 158 in a center thereof. A bottom end of the shaft 152 is received in the opening 158, and the shaft 152 is thus fixedly connected with the drive member 156. A circumferential driven portion 165 extends upwardly from the bottom plate 157, and an annular cutout (not labeled) is defined in an outside of the driven portion 165. An annular magnetic shield 161 is attached to an outside of the driven portion 165 in the cutout, and an annular magnet 163 is attached to an outside of the magnetic shield 161 in the cutout. The magnet 163 is surrounded by free ends of the stator laminations 132, thereby defining a cylindrical gap between the stator laminations 132 and the magnet 163. The cover 170 is for preventing contaminants such as dust from accessing a bottom one of the bearings 126 and entering a clean chamber (not labeled) of the data storage device 100 that surrounds the shaft 152. The cover 170 is similar to the cover 70, of the preferred embodiment. The baseplate 122 and the cover 170 cooperatively define a chamber 175 therebetween. The chamber 175 contains the stator laminations 132 and drive member 156 therein.

Referring to FIG. 1, in the data storage device 10 of the present invention, the hub 54 and the drive member 56 are located at opposite sides of the baseplate 22. Compare this with conventional data storage devices, in which a hub and a stator are engaged on a same side of a baseplate. Thus a height of the data storage device 10 from the baseplate 22 to the top of the hub 54 is reduced. The data storage device 10 can be used in a wider variety of portable applications. In addition, the dynamic properties of the data storage device 10 are improved, because loads on the bearings 26 and the shaft 52 are more balanced. In particular, the data storage device 10 can operate more stably. Compare this with the relatively poor dynamic properties of conventional data storage devices, which are characterized by instability of bearings and a spindle shaft located far from the baseplate. Moreover, the data storage device 10 comprises the cover 70 for preventing contaminants such as dust from entering the clean chamber CR in which the disk 80 are received, thus enabling the data storage device 10 to reliably endure harsh operating conditions and environments. The cover 70 can also prevent people from accidentally contacting the rotor that could hurt the people.

All the above-described benefits of the data storage device 10 of the preferred embodiment of the present invention are correspondingly applicable for the data storage device 100 of the alternative embodiment of the present invention.

While the present invention has been illustrated by the description of preferred embodiments thereof, and while the preferred; embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A data storage device comprising:
   a stator comprising a baseplate having a vertical tube in a middle thereof, having an upwardly extending portion and a downwardly extending portion with respect to said baseplate, to which a plurality of stator laminations are attached, extending radially outward from said downward extending portion into an annular recess in said base plate surrounding said lower portion;
   a rotor including a shaft rotatably connected to the inside of said vertical tube by a plurality of bearings and defining two opposite ends with a hub connected to one end above said baseplate and a drive member connected to the other end below said baseplate; wherein the drive member comprises at least one magnet located in an outer position radially relative to said stator laminations and oppositely cooperating with said stator laminations, wherein said at least one magnet is in the form of an annular ring which surrounds the stator laminations with an air gap therebetween;
   a cover attached to said baseplate, to form, along with said baseplate, a clean chamber enclosing said drive member and said laminations in said annular recess, thereby shielding said drive member and preventing contaminants from accessing a bottom one of said plurality of bearings surrounding the shaft; and
   at least one data storage disk mounted on the hub.

2. The data storage device as claimed in claim 1, wherein said magnet is fastened to a magnetic shield which in turn is fastened distally to said drive member.

3. The device as claimed in claim 1, wherein both ends of said shaft extend beyond the stator axially.

4. A data storage device comprising:
   a stator comprising a baseplate having a vertical tube in a middle thereof, having an upwardly extending portion and a downwardly extending portion with respect to said baseplate, to which a plurality of stator laminations are attached, extending radially outward from said downward extending portion into an annular recess in said base plate surrounding said lower portion;
   a rotor including a shaft rotatably connected to the inside of said vertical tube by a plurality of bearings and defining two opposite ends with a hub connected to one end above said baseplate and a drive member connected to the other end below said baseplate; wherein the drive member comprises at least one magnet located in an outer position radially relative to said stator laminations and oppositely cooperating with said stator laminations;
   a cover comprising a bottom tray and a fixing portion fixed to the baseplate, the cover and the baseplate cooperatively defining a clean chamber therebetween containing the stator laminations and drive member, thereby shielding said drive member and laminations, and preventing contaminants from accessing a bottom one of said plurality of bearings surrounding the shaft; and
   at least one data storage disk mounted on the hub.

5. The data storage device as claimed in claim 4, wherein said magnet is fastened to a magnetic shield which in turn is fastened distally to said drive member.

6. The device as claimed in claim 4, wherein both ends of said shaft extend beyond the stator axially.

* * * * *